Oct. 20, 1936.   P. H. DIXON   2,057,884
STITCH FORMING MACHINE
Filed April 18, 1932   13 Sheets-Sheet 1

Inventor
Paul H. Dixon
by Rippey & Kingsland
His Attorneys.

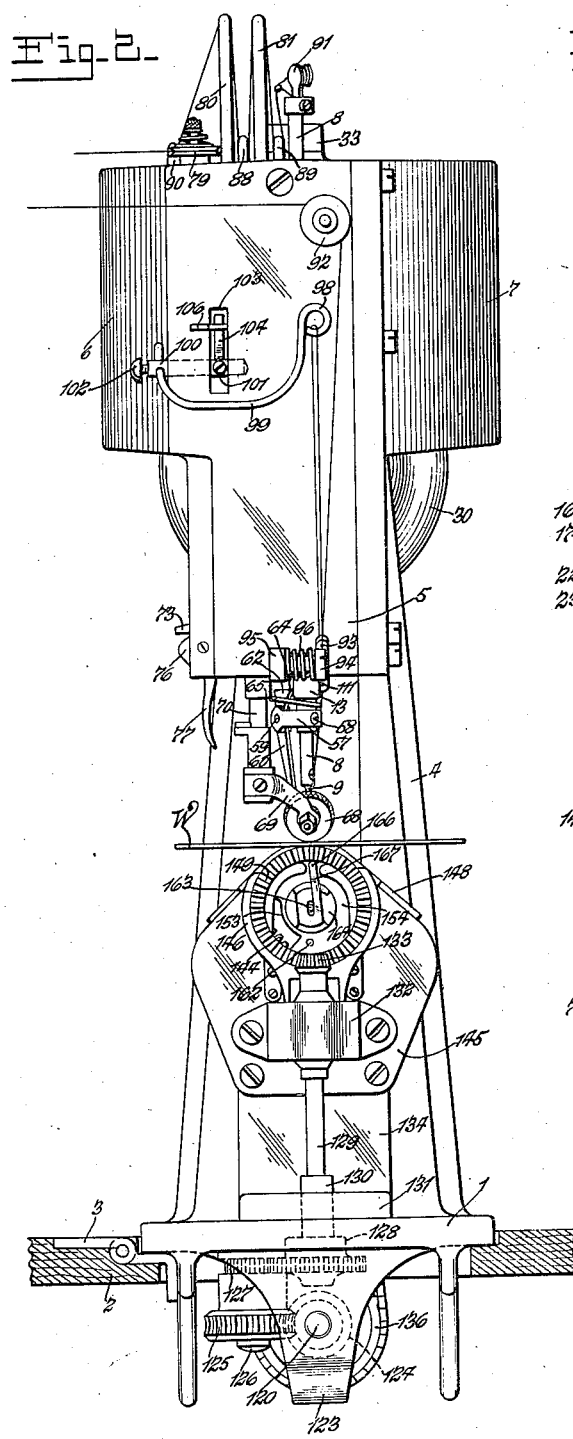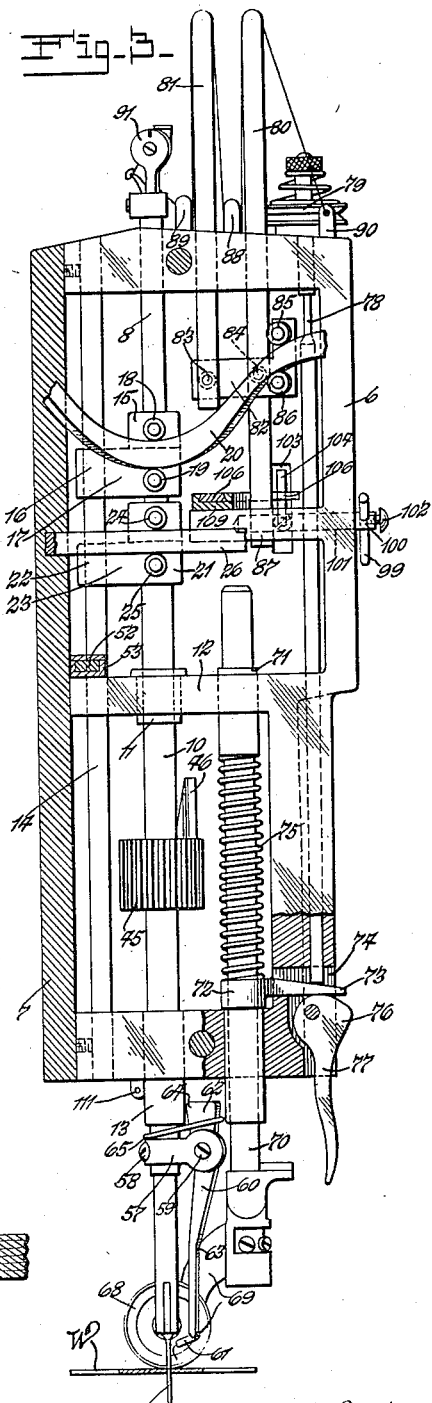

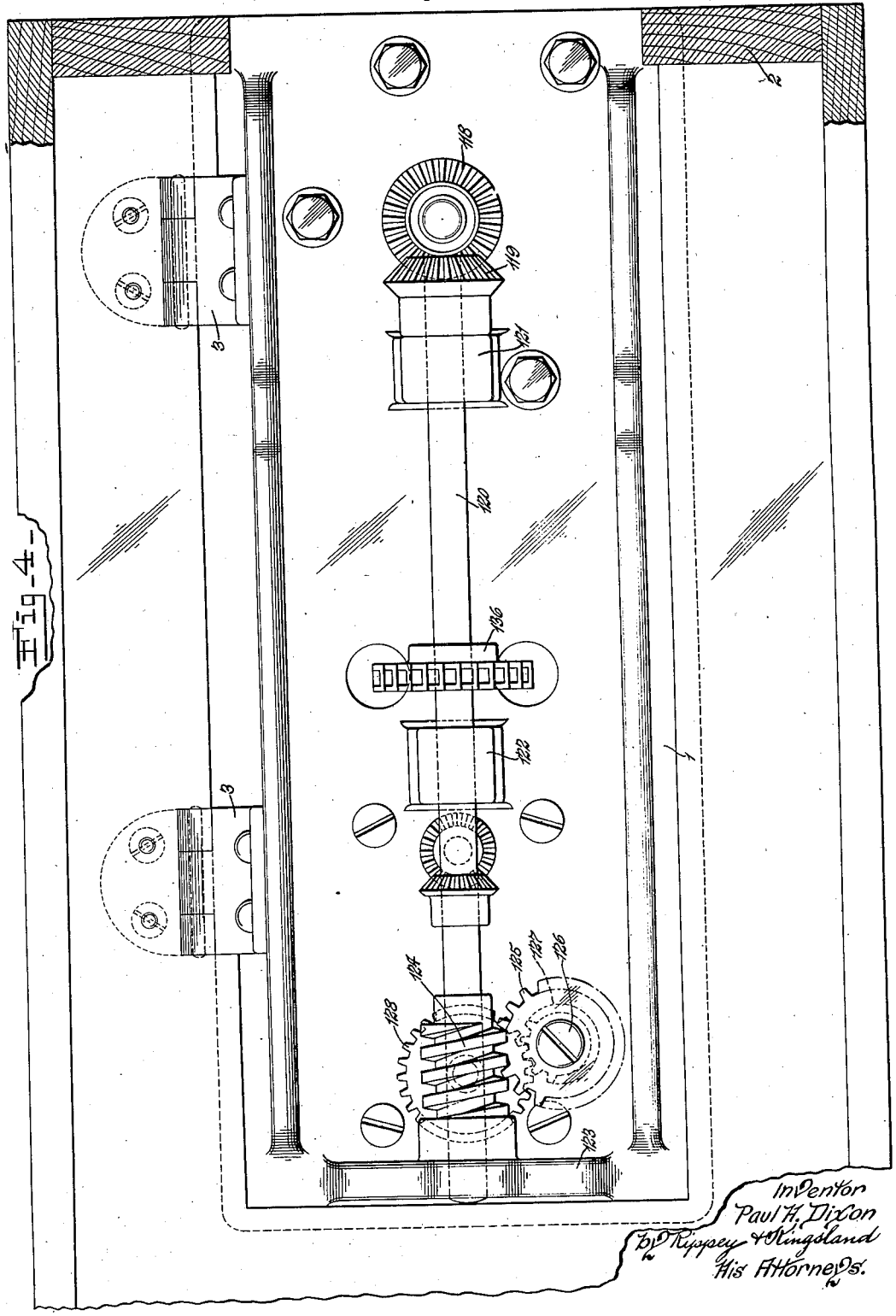

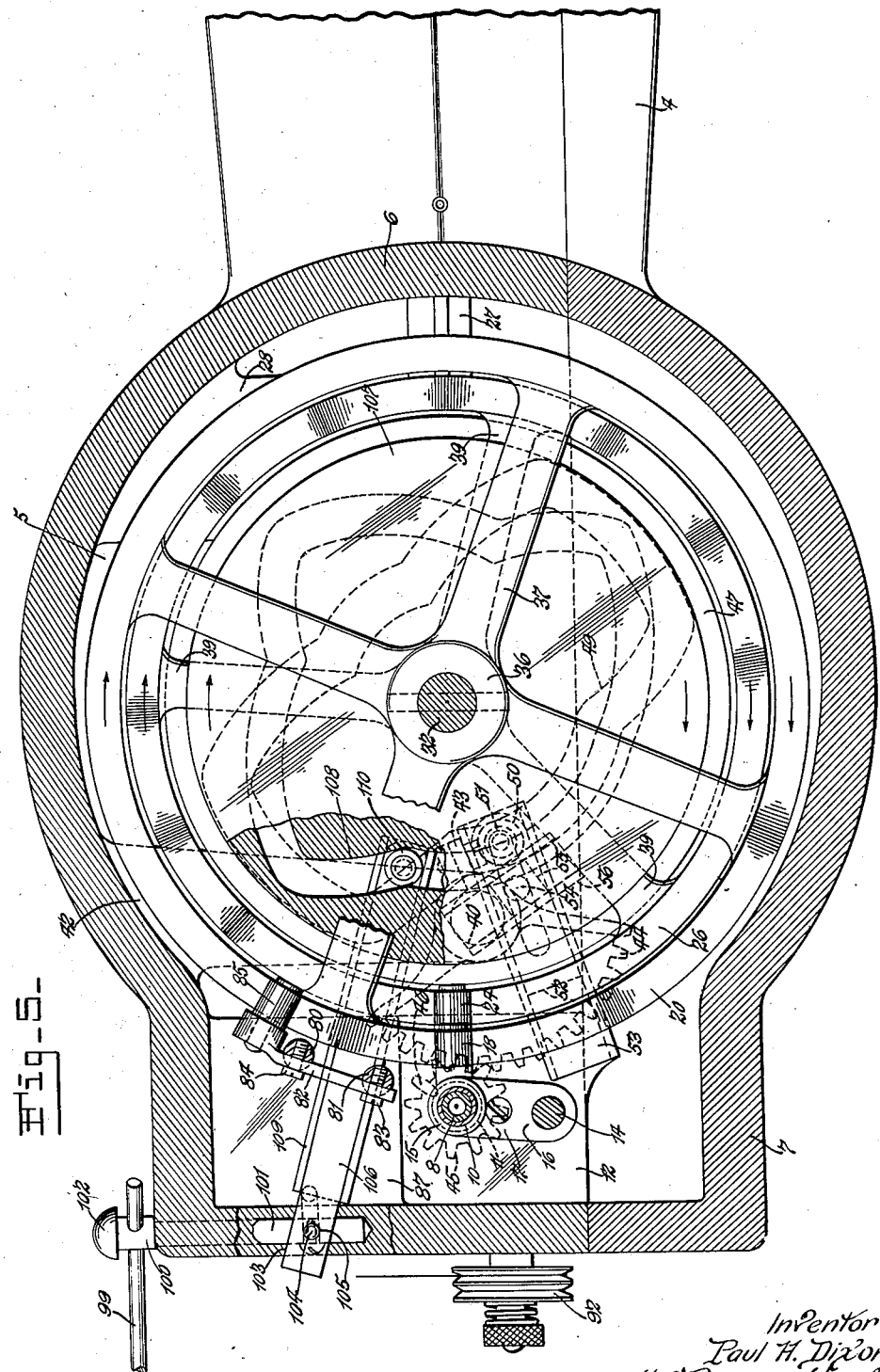

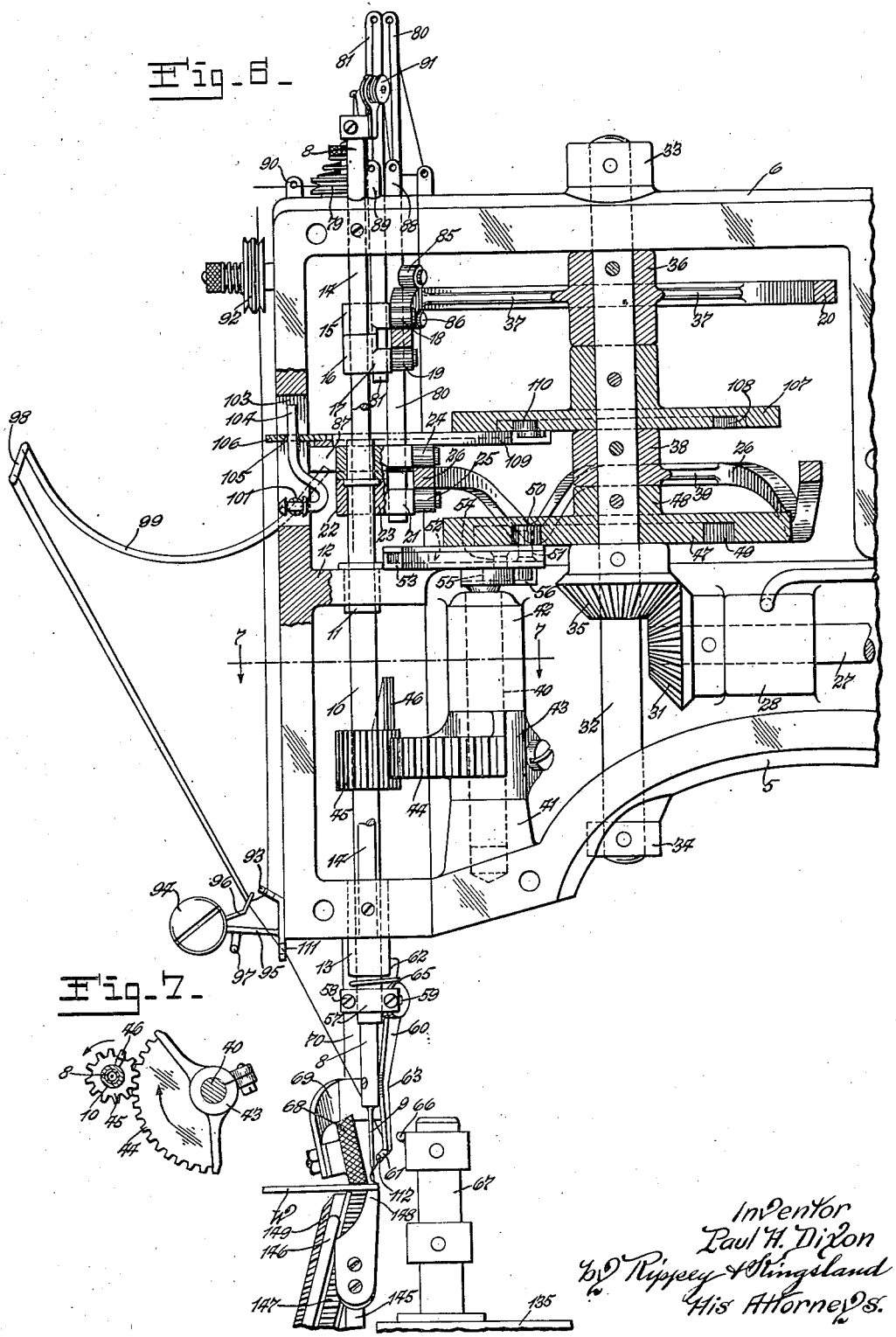

Oct. 20, 1936.  P. H. DIXON  2,057,884
STITCH FORMING MACHINE
Filed April 18, 1932   13 Sheets-Sheet 6
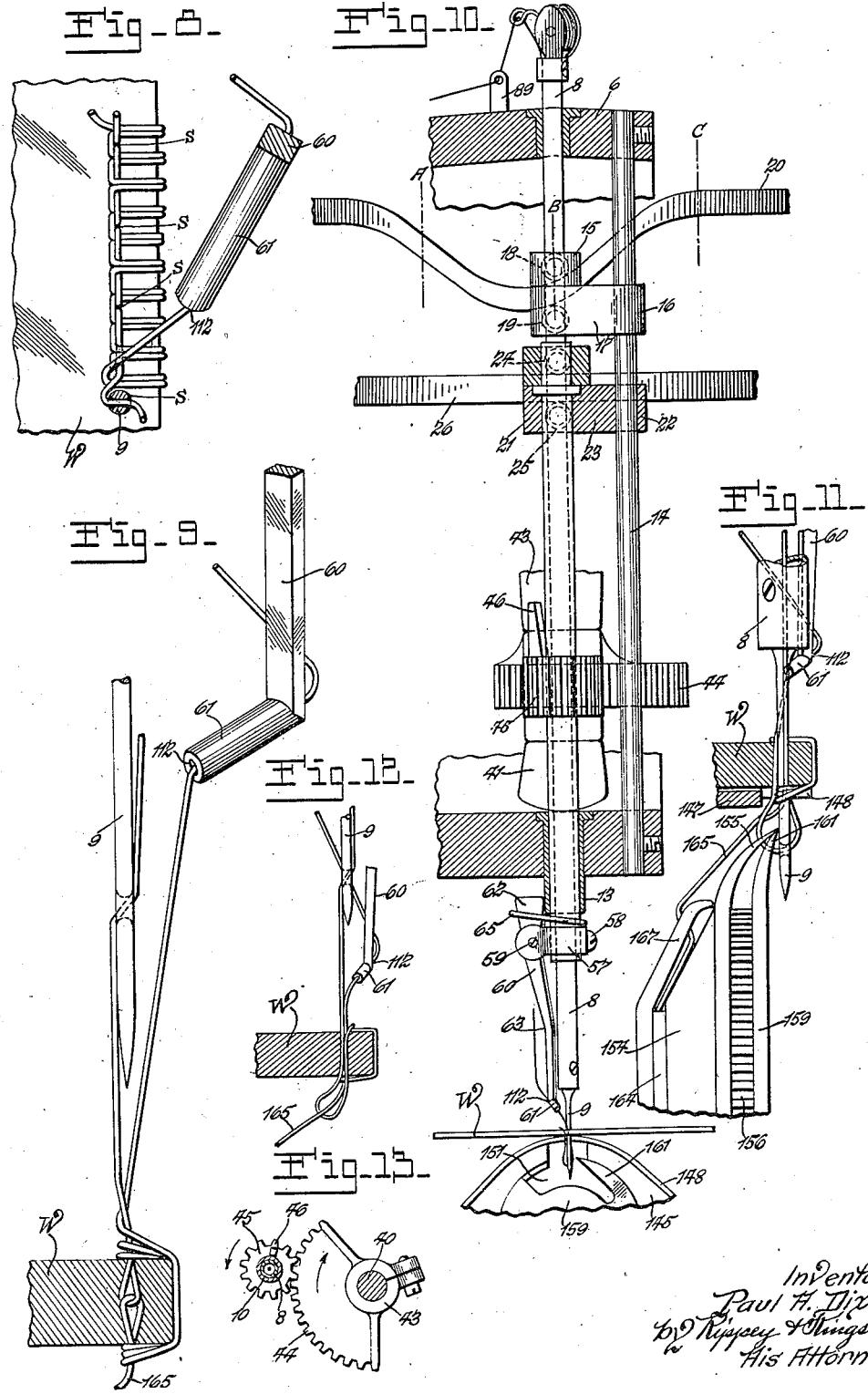

Oct. 20, 1936.  P. H. DIXON  2,057,884
STITCH FORMING MACHINE
Filed April 18, 1932  13 Sheets-Sheet 7
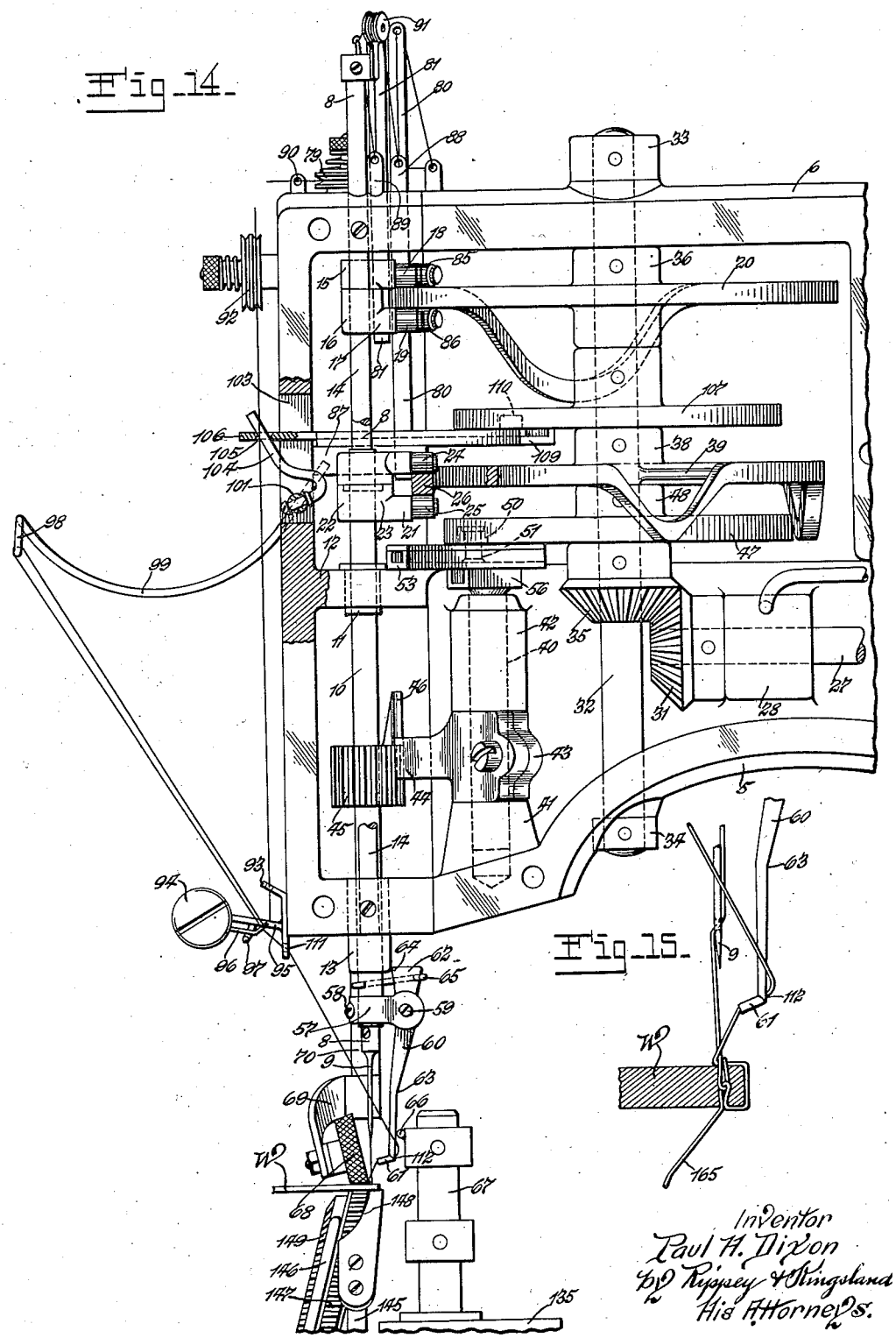

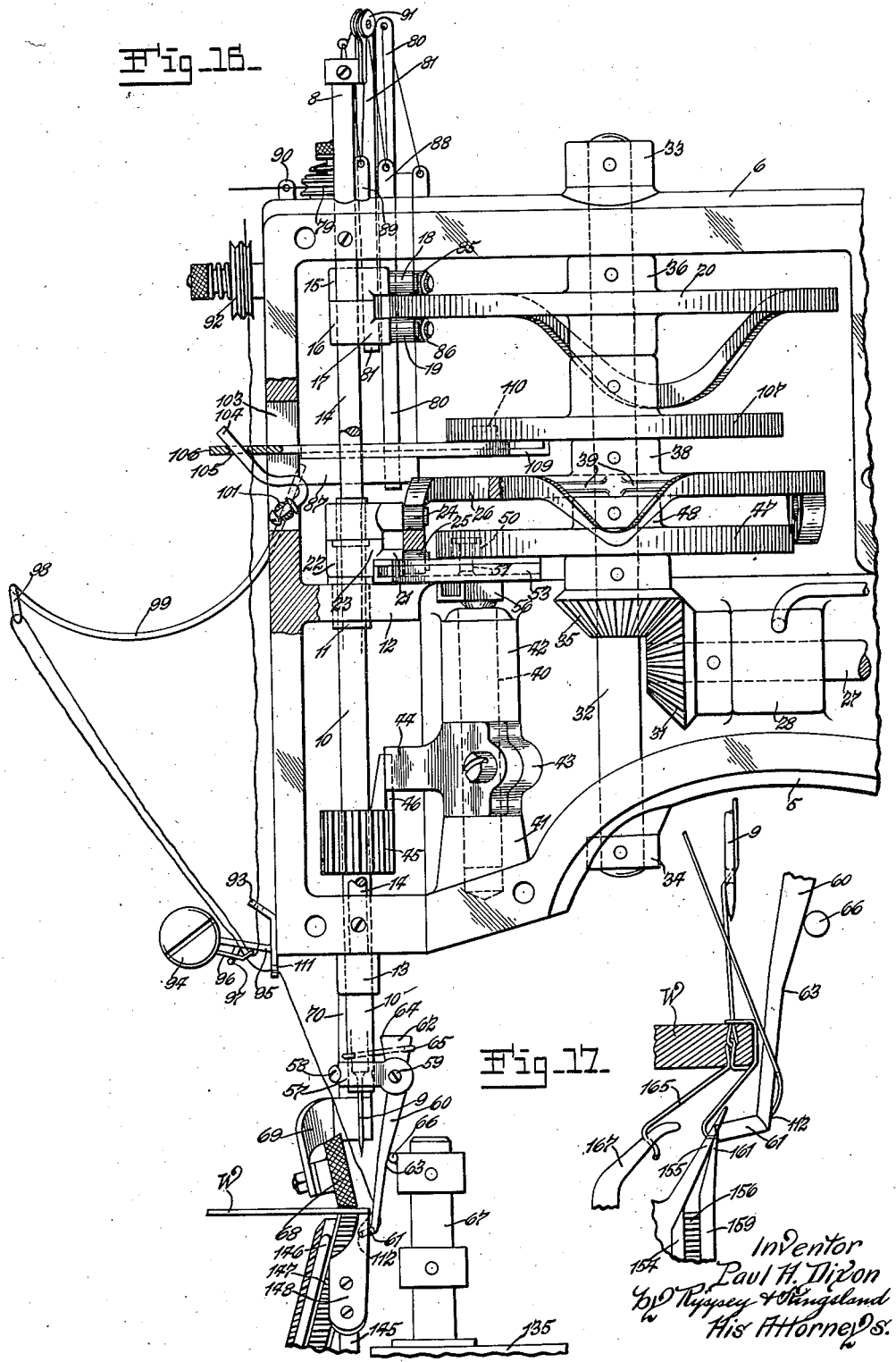

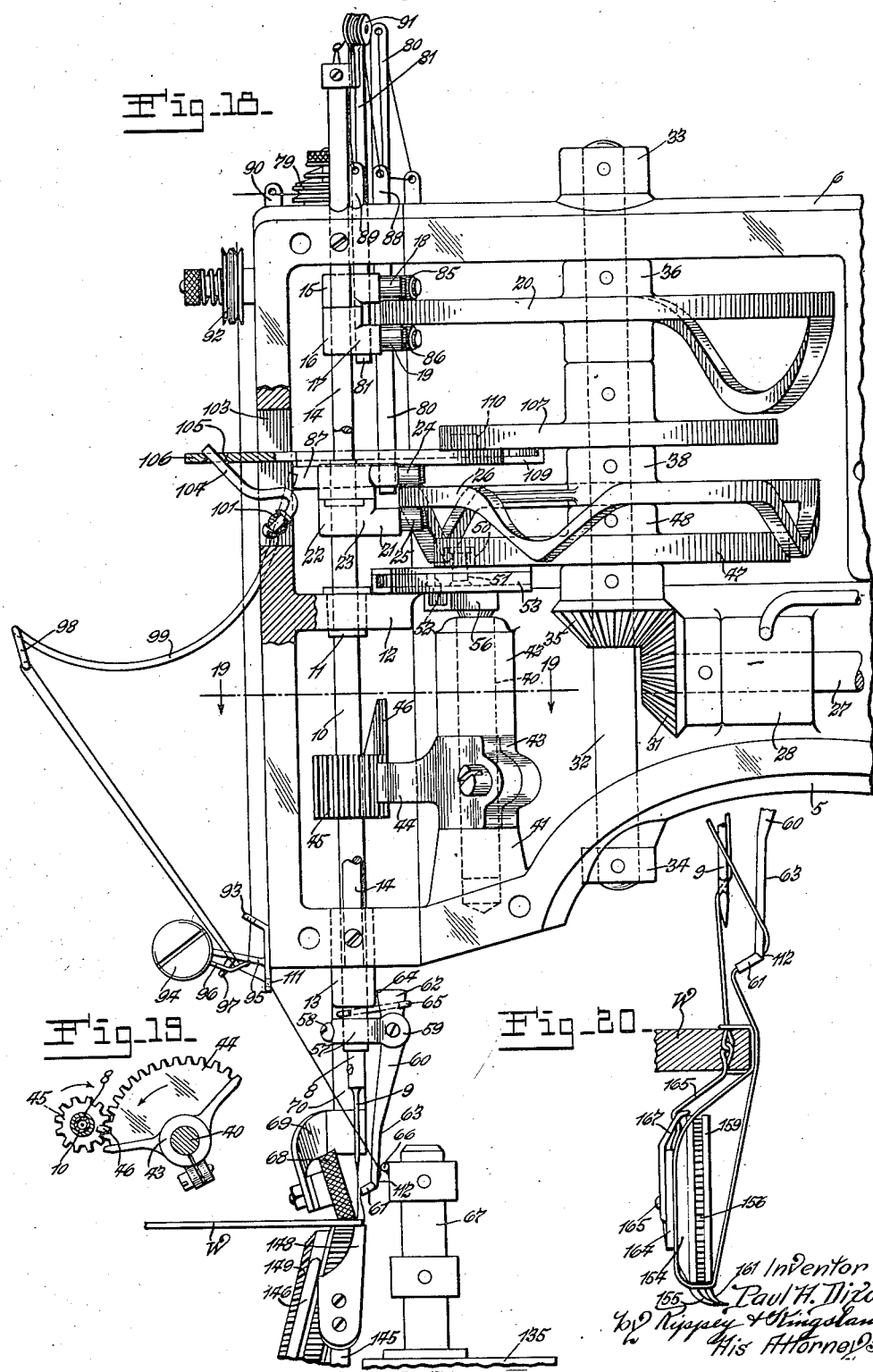

Oct. 20, 1936.  P. H. DIXON  2,057,884
STITCH FORMING MACHINE
Filed April 18, 1932  13 Sheets-Sheet 10
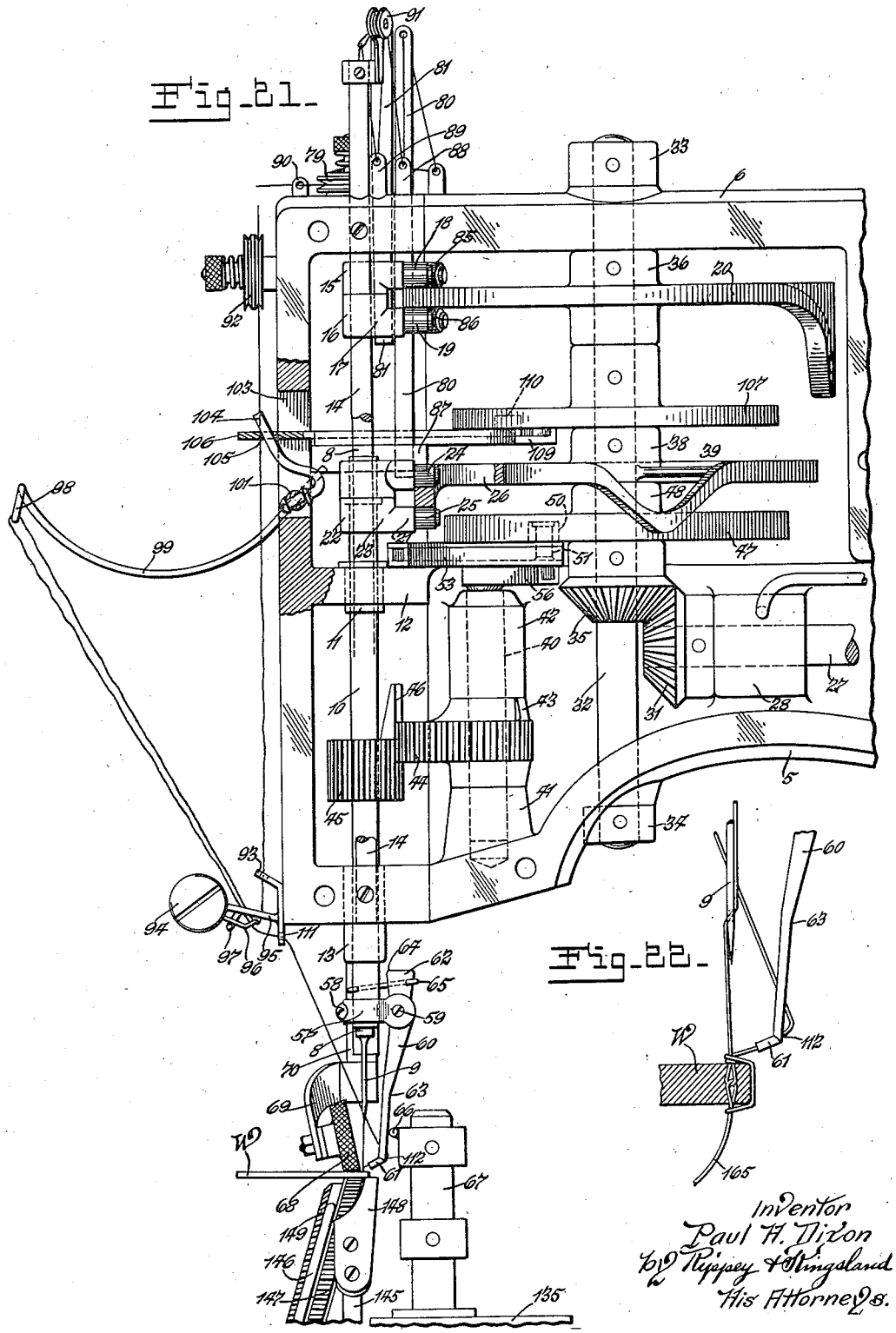

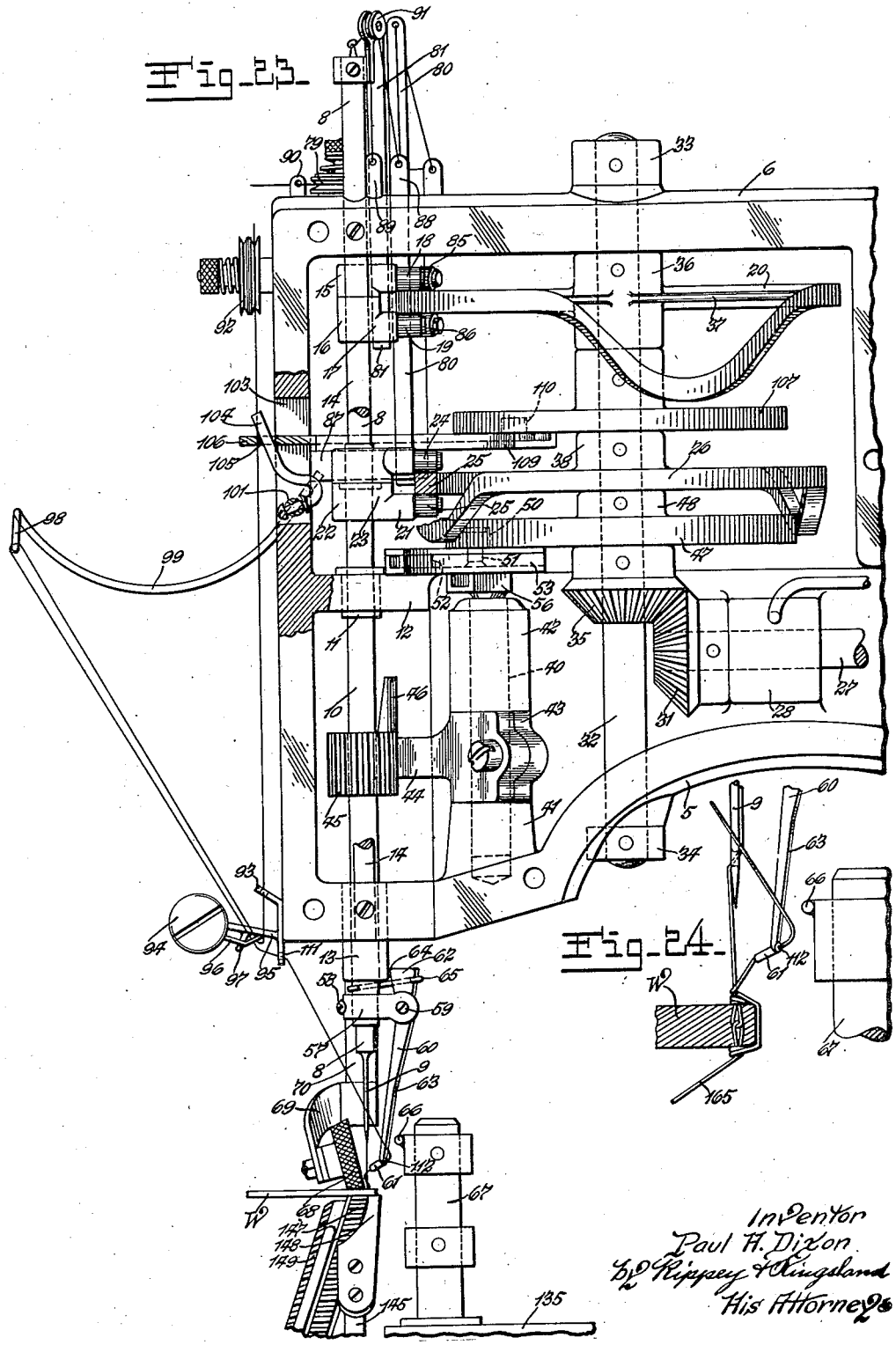

Oct. 20, 1936.  P. H. DIXON  2,057,884
STITCH FORMING MACHINE
Filed April 18, 1932  13 Sheets-Sheet 12
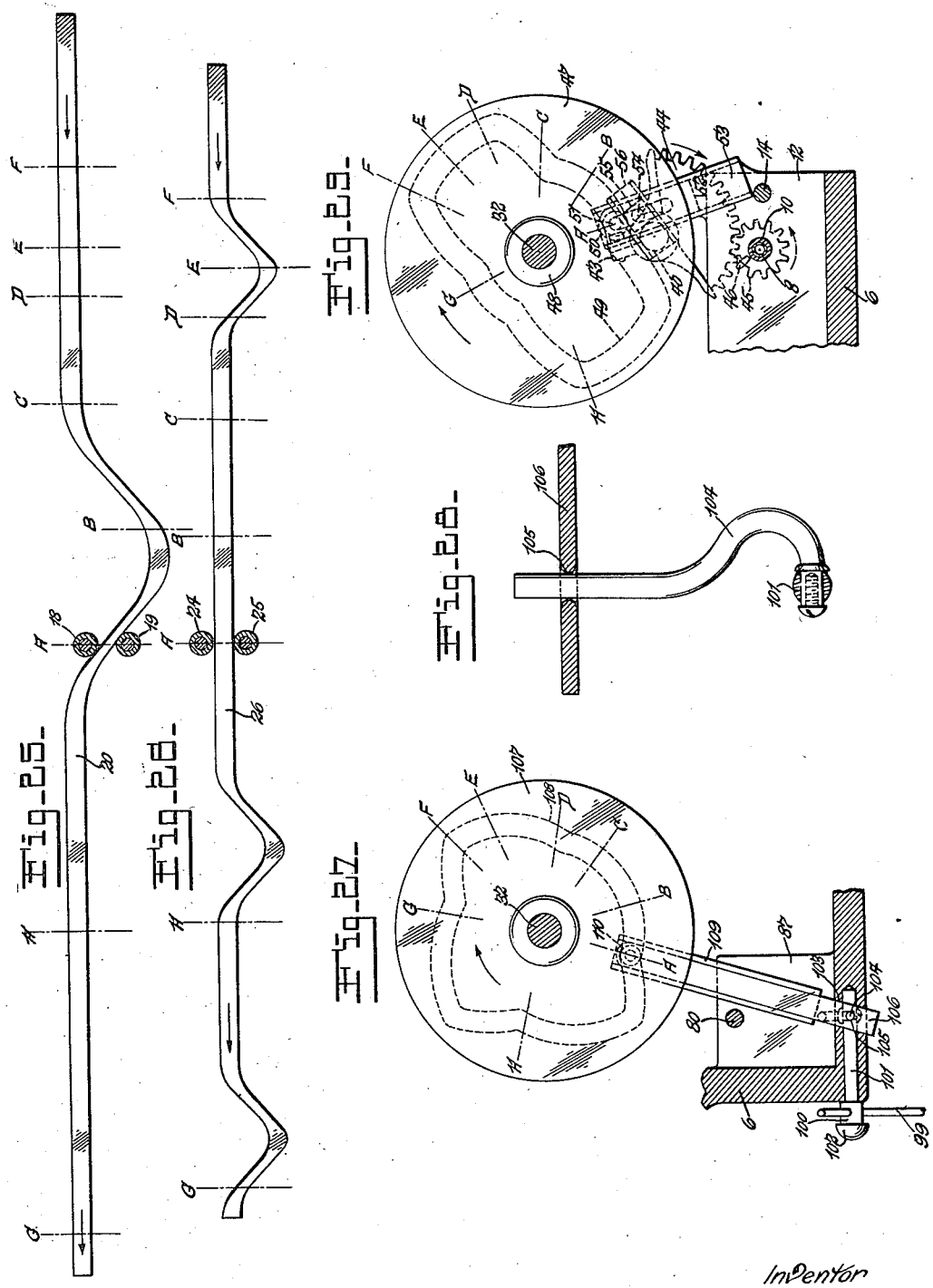
Inventor
Paul H. Dixon
by Rippey & Kingsland
His Attorneys.

Oct. 20, 1936.                P. H. DIXON                2,057,884
                        STITCH FORMING MACHINE
                    Filed April 18, 1932      13 Sheets-Sheet 13
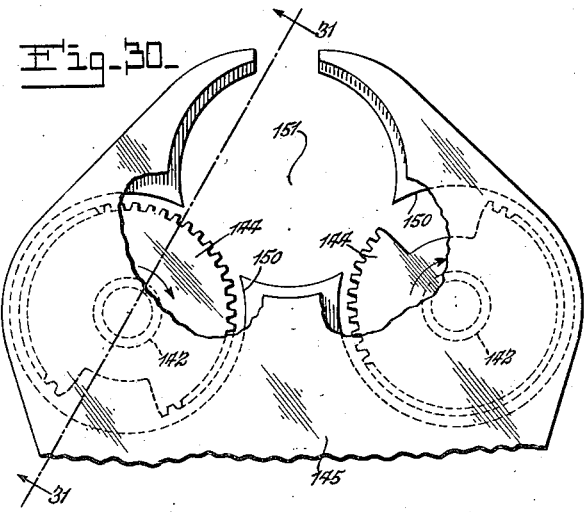
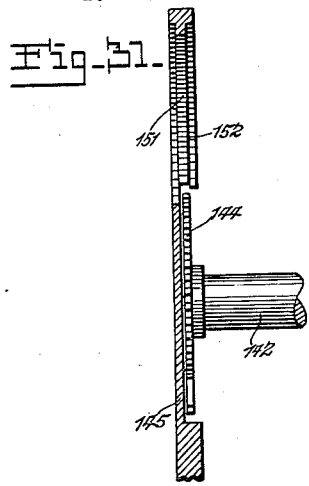
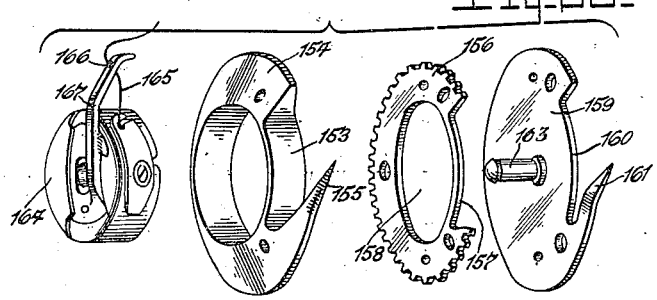
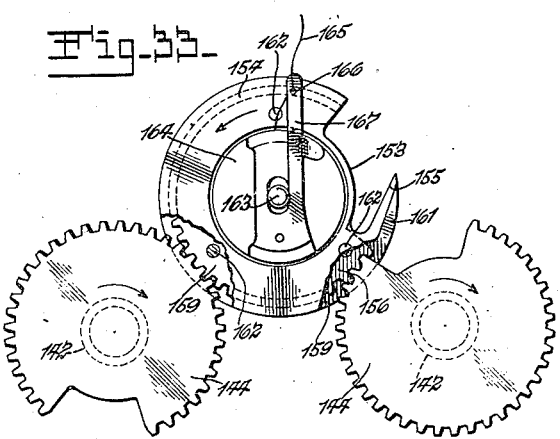
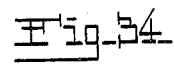
Inventor
Paul H. Dixon Patented Oct. 20, 1936

2,057,884

UNITED STATES PATENT OFFICE 2,057,884

STITCH-FORMING MACHINE

Paul H. Dixon, Springfield, Ill.

Application April 18, 1932, Serial No. 605,824

16 Claims. (Cl. 112—162)

This invention relates to improvements in stitch-forming machines; and consists in the novel construction hereinafter disclosed.

An object of the invention is to provide a machine for forming a continuous basic stitch on the margin of objects of leather, such as shoes, or articles of fabric, and then overcasting the marginal edge in such a manner that the overcast stitch is anchored in and held by the basic stitch, thereby forming a marginal binding or finish to the articles.

Another object of the invention is to provide a machine whereby the edge of leather or articles of fabric material may be covered or bound with stitches or strands of thread, a number of said strands being held and locked by a basic stitch, thus forming and securing the binding to the margin with a minimum number of needle holes in the margin of the work.

A particular object of the invention is to provide a machine suitable for the production of a composite stitch forming a binding for binding the edges of shoe uppers, or for finishing the edges of cut-outs in shoes, which may be operated rapidly and economically for performing the binding operation, producing a finish that may be used in lieu of the usual French binding on finished shoes.

Another object of the invention is to provide a machine equipped with mechanism for forming a basic lock stitch on the margin of leather or fabric articles, together with means for simultaneously providing a stitch running normal to the basic stitch to overcast the marginal edge of the article to which it is applied, with provision for locking the threads of the overcast marginal stitch with the basic lock stitch.

Another object of the invention is to provide a machine having coordinated needle and bobbin mechanism in combination with a looping mechanism for throwing a stitch normal to the basic lock stitch to overcast or bind the marginal edge of leather or fabric articles.

Another object of the invention is to equip a machine of the kind described with an improved form of bobbin stitch mechanism whereby, in cooperation with a needle stitch, a row of lock stitching is formed along the marginal edge of the material operated on, in combination with means for throwing stitches normal to the threads of the lock stitch and connecting the threads of the overcast stitch with the needle and bobbin part of the lock stitch.

The detailed advantages of the construction will be apparent without additional specific mention thereof, and will be understood from the following detailed description of the machine, taken in connection with the accompanying drawings, in which—

Fig. 2 is a side elevation viewing the machine from the left side thereof.

Fig. 3 is a vertical section substantially on the line 3—3 of Fig. 1.

Fig. 4 is an inverted plan view showing the underface of the base plate and the mechanism carried thereby.

Fig. 5 is a longitudinal section taken substantially on the line 5—5 of Fig. 1, illustrating the operating mechanism for the needle bar and the looper bar, the cams comprising the mechanism being shown in the initial position of the stitch formation.

Fig. 6 is an enlarged front elevation with parts of the machine being shown in section, the operating position of the machine being the initial position of the stitch-forming operation.

Fig. 7 is a section on the line 7—7 of Fig. 6.

Fig. 8 is an enlarged plan view of partially performed work showing the relationship of the needle and looper member and of the stitched threads at the initiation of the subsequent stitch-forming operation.

Fig. 9 is an enlarged elevation of the same parts at the stage of the stitching operation illustrated in Fig. 8.

Fig. 10 is an elevation of a part of the machine viewing the parts from the left side, some of the elements being shown in section and the adjustment of the elements in the second position of the stitch-formation operation.

Fig. 11 is a detail view of the stitch mechanism with the bobbin, needle and looper device shown in the second position.

Fig. 12 is a detail view of the needle and looper device showing these parts in association with the work and stitch in the third position.

Fig. 13 illustrates the position of the looper oscillating mechanism when the stitch forming elements are in the third position.

Fig. 14 is a view similar to Fig. 6 showing the mechanism in the fourth position of the stitch formation.

Fig. 15 is a view similar to Fig. 12 showing the parts in the fourth position.

Fig. 16 is a view of the same parts as shown in Fig. 14 moved to the fifth position.

Fig. 17 illustrates the detailed development and movement of the stitch-forming elements, and illustrates these parts in the fifth position.

Fig. 18 is likewise a view similar to Fig. 6 showing the adjustment of the mechanism in the sixth position of the stitch-formation.

Fig. 19 is a cross-section on the line 19—19 of Fig. 18 to show the position of the looper oscillating mechanism in the sixth position.

Fig. 20 is a view similar to Fig. 17 showing the stitch-forming elements in the sixth position.

Fig. 21 is likewise a view similar to Fig. 6, but showing the adjustment of the mechanism in the seventh position.

Fig. 22 is a view similar to Fig. 15, but showing the parts moved to the seventh position.

Fig. 23 is a view similar to Fig. 6, showing the adjustment of the mechanism to the eighth position.

Fig. 24 is a view similar to Fig. 22, showing the further development of the stitch with the parts in the eighth position.

Fig. 25 is a diagrammatic layout of the needle bar operating cam, the construction lines illustrating the various positions on the cam for effecting the several operating movements of the needle bar.

Fig. 26 is a diagrammatic layout of the looper bar operating cam, the construction lines illustrating the various positions on the cam for effecting the several operating movements of the looper bar.

Fig. 27 is a plan view of the looper thread take-up cam and associated parts.

Fig. 28 is an enlarged detail view of a part of the looper thread take-up device.

Fig. 29 is a plan view of the looper bar oscillating cam and associated parts.

Fig. 30 is a detail view of the sewing hook support together with the operating mechanism therefor.

Fig. 31 is a cross-section taken substantially on the line 31—31 of Fig. 30.

Fig. 32 is a perspective detail view of the bobbin and sewing hook elements disassembled.

Fig. 33 is a detail view showing the bobbin, sewing hook and driving gear assembly therefor viewed from the left side of the machine.

Fig. 34 is an edge view of the sewing hook.

Figure 1:
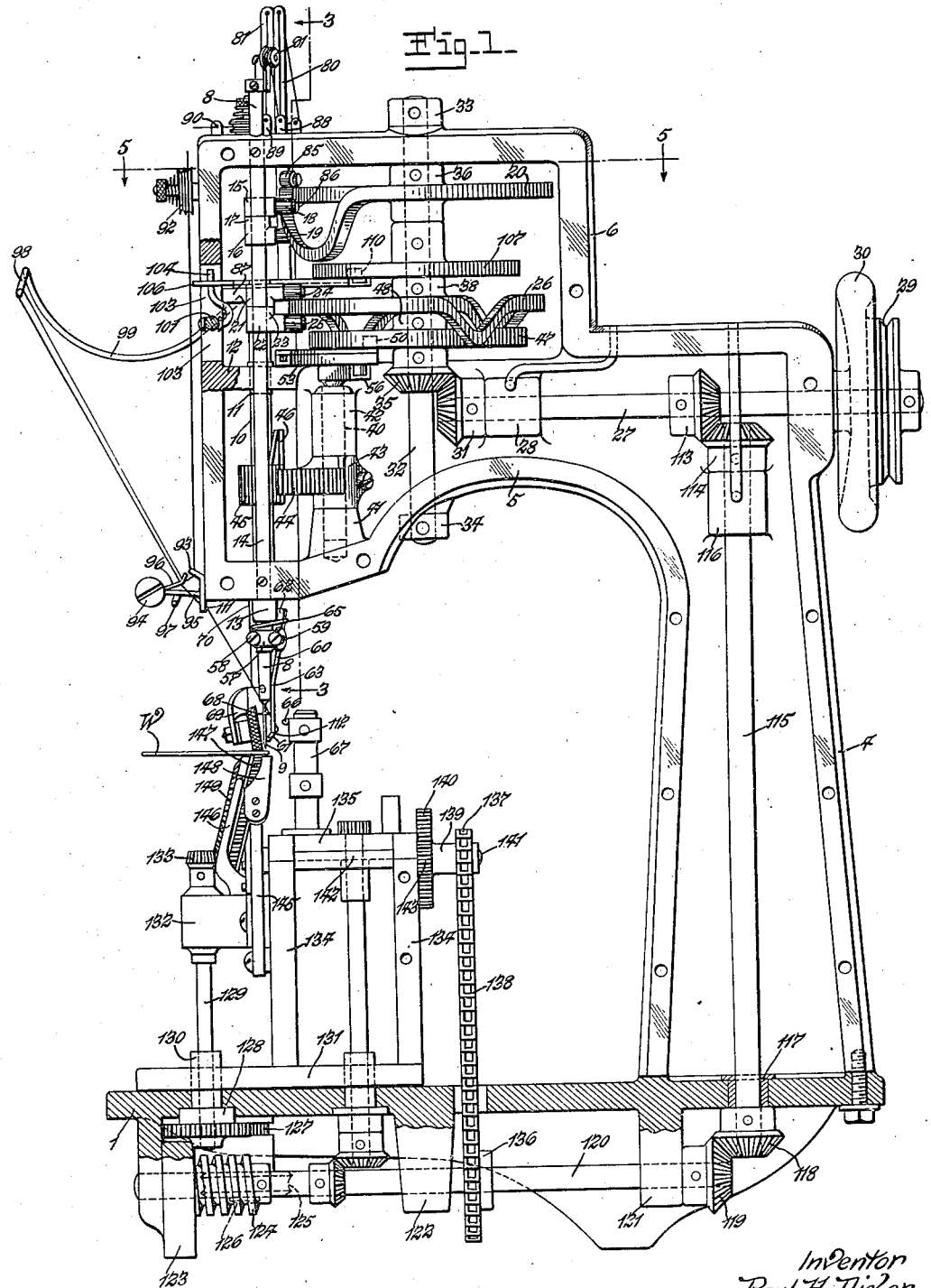
Fig. 1 is a front view of the machine showing the base plate in section.

In the embodiment of the invention illustrated in the drawings, the machine is shown as including a base plate 1 which is preferably arranged to be mounted on the top of a housing support 2 to which it is hinged by hinges 3. Formed integral with the base plate is a head which includes a hollow standard 4 and an overhanging arm 5 which extends upwardly to form a head portion 6. A removable plate 7 has a conformation that completes the contour of the head and, when in place, forms a closed housing for the operating mechanism contained within the head of the machine. It will be understood that the construction of the head of the machine may be of any optional design.

In the forward portion of the head and arranged for vertical reciprocation is a needle bar 8. The needle bar extends from above the top face of the head 5 through the housing and below the lower edge of the overhanging portion of the housing. The needle bar is hollow and is mounted in a bushing through an opening in the top wall of the member 5 and extends through the bottom wall and is arranged to carry a needle 9 at its lower extremity.

For a part of its length the needle bar extends through a hollow looper bar 10, said bar 10 being arranged to telescope over a lower section of the needle bar. The bar 10 is mounted for vertical reciprocation and for oscillation in the head, being supported by a bushing 11 formed in a web 12 extending inwardly from the inner wall of the side vertical member of the overhanging head of the machine, and in a bushing 13 extending through an opening in the bottom wall of the overhanging member 5, said bushing having a cylindrical extension that projects below the lower face of said wall. Running parallel with and spaced forwardly from the needle bar and looper bar is a guide bar 14 rigidly mounted in the head and supported between the top and bottom walls thereof. The needle bar near the upper end thereof carries a bracket that includes a collar 15 to which a sleeve 16 is connected by a yoke 17. The sleeve 16 is mounted for sliding movement on the rod 14, thereby providing a guide holding the bracket member from turning during the operation of the needle bar. It will be understood that the collar 15 is adjustably set on the needle bar so that the bracket moves with the needle bar when the same is reciprocated. The bracket, in vertical alinement with the collar 15, carries spaced cam rollers 18 and 19. The rollers 18 and 19 ride on opposite faces of the needle bar operating cam 20.

The looper bar 10, which terminates below the lowermost movement of the bracket carried by the needle bar, also is provided with a bracket including a collar 21 and a sleeve 22 connected by a yoke 23. The sleeve 22 rides upon the rod 14 and operates in a manner similar to the sleeve 16 to prevent lateral movement of the looper bar bracket. The looper bar is held in the collar 21 against vertical movement, but the upper end of the looper bar is revoluble in the collar 21. The bracket, in vertical alinement with the collar 21, carries spaced cam rollers 24 and 25. The rollers 24 and 25 ride on opposite faces of the looper bar operating cam 26.

The cams 20 and 26, as well as certain other mechanism that will be referred to hereinafter, are power driven by driving mechanism which includes a power shaft 27 journalled at one end in a bearing formed in the right wall of the standard 4 near the top thereof and, at the other end, in a bearing 28 extending inwardly from the back wall of the member 5. The shaft 27, exteriorly of the housing, carries a pulley 29 and, for convenience of initial adjustment, a hand wheel 30, it being understood that the pulley is connected with any suitable source of power. The shaft 27, at its inner end and beyond the bearing 28, carries a beveled pinion 31. Extending vertically and at right angles to the shaft 27 is a shaft 32 journalled at its upper end in a bearing 33 in the top wall of the extension 6 of the member 5 and, at its lower end, in a bearing 34 in the bottom wall of the member 5. The shaft 32 carries a beveled pinion 35 that meshes with the pinion 31 so that, as the power shaft 27 is rotated, the shaft 32 will be rotated on a vertical axis.

The cam 20 constitutes the rim of a cam wheel that includes a hub member 36 fixed to the shaft 32 and spokes 37. The cam 26 constitutes the rim of a cam wheel that includes a hub member 38 fixed to the shaft 32 and spokes 39. The contours of the cams 20 and 26, respectively, are developed to synchronize the reciprocation of the needle bar and of the looper bar. The relationship of the cams 20 and 26 are diagrammatically shown in Figs. 25 and 26 of the drawings, and the cam segments are indicated by the construction lines in these views.

For the purpose of convenience of description, the operative stitch positions may be conveniently divided into eight different components comprising the machine cycle and, in order to lend clearness to the description, the components of the cycle are indicated on these views sequentially by the letters A to H, inclusive.

In addition to the reciprocating movements of the needle bar and looper bar, respectively, the looper bar is given a rotary reciprocatory movement synchronized with the vertical reciprocations of these elements.

The mechanism for imparting this movement to the looper bar includes a stud shaft 40 mounted at its lower end in a bearing 41 supported by the bottom internal wall of the member 5 and, at its upper end, in a bearing 42 extending inwardly from the rear wall of the member 5. The shaft 40 has a split collar 43 affixed thereto, which collar has integrally formed therewith a segmental gear 44 that extends toward the looper bar 10. The segmental gear 44 meshes with a pinion 45 fixed to the looper bar. The pinion 45 has one tooth extended to form the toothed projection 46 so that, when the looper bar reciprocates vertically, the tooth 46 will remain in mesh with the segmental gear at the points in the circumferential movement of the pinion 45 where the vertical reciprocation of the looper bar occurs. The shaft 40 is rocked to actuate the segmental gear 44 in synchronism with the other operative movements of the machine.

The mechanism for rocking the shaft 40 includes a cam comprising a cam disc 47 having a hub section 48 that is fixed to the shaft 32 beneath the looper bar cam. The disc 47 has a cam groove 49 formed in its underface which cooperates with a cam roller 50 carried by a pin 51, said pin 51 being fixed at its lower end to a slide bar 52 mounted in a housing 53, which housing is formed integral with the web 12. As the cam disc 47 is revolved, the slide bar 52 is reciprocated in the housing 53, thereby reciprocating a pin 54 fixed to said slide bar. Said pin 54 is pivotally connected with a slide block 55 that slides in a rocker arm 56. The arm 56 is disposed at an angle intersecting the housing 53. One end of the arm 56 is attached to the upper end of the shaft 40 so that, as the slide block 55 is reciprocated, it oscillates the arm 56, thereby oscillating the shaft 40 in timed relation with the other movements of the machine.

The relationship of the parts just described will be better understood by reference to Fig. 29, in which the several parts are indicated in their operative relationship and from which it will be understood that the slide bar 52 is reciprocated in conformity with the contour of the cam groove 49, this movement, in turn, being translated by a pin and crank arm movement into a rocking movement of the shaft 40, and thereby imparting a rocking reciprocatory movement to the segmental gear 44, imparting by its movement a rocking movement to the looper bar 10 through the pinion connection therewith.

The looper bar carries at its lower end a looper device which comprises a collar 57 which may be adjustably connected with the looper bar by set screws 58, the collar being provided with extensions through which a hinge screw 59 extends. A looper lever 60 is pivotally carried by the hinge screw 59 and is formed with an inwardly oscillating thread-eye arm 61 at its lower end and with an enlarged head 62 at its opposite end. The long arm of the lever 60 that projects below its pivot point is formed with a shoulder 63, and the head 62 is formed with a beveled edge 64. A spring 65 engages the head of the lever and is connected with the looper bar at its opposite end. The tendency of the spring is to hold the lower end of the lever outwardly or away from the margin of the work to permit vertical reciprocation of the looper without contacting with the work. When the looper bar is raised and the lever carried upwardly, the beveled edge 64 engages with the lower beveled edge of the bushing 13, which tends to move the lower arm of the lever inwardly toward the needle. Likewise, when the looper bar is lowered, the shoulder 63 rides against an arm 66 carried on a support 67 positioned adjacent to the lever. The looper, therefore, on each reciprocation, has a rotary movement and also a lateral inward movement imparted thereto the purpose of which will be more fully described at a later point in this description.

The machine is also equipped with a pressure feed roller 68 that operates adjacent to the stitching point, said pressure feed roller being carried by an arm 69 supported at the lower end of a pressure feed roller bar 70. The bar 70 projects through the bottom wall of the member 5 in parallel alinement with the needle bar and looper bar, and is spaced therefrom. The upper end of the bar 70 extends through a bushing 71 carried in the web 12. The bar 70 carries a collar 72 having an outwardly extending guide bracket 73 that projects through an opening 74 in the rear wall of the member 5. An expansion spring 75 is interposed between the lower end of the bushing 71 and the collar 72 and tends to depress the pressure feed roller bar. A cam lever 76 is pivoted in a slot 77 in the rear wall of the member 5 and is adapted to raise the bracket 73, and thereby the bar 70, in opposition to the spring 75, thereby raising the pressure feed roller from the work.

A rod 78 extends downwardly through the head of the machine and is operatively connected with the bracket 73 so that, when said bracket is raised, the rod 78 will be moved upwardly. The rod 78 is operatively connected with a needle thread tension 79 so that, when the pressure feed roller is raised, one of the discs of the needle thread tension will be raised, releasing the tension upon the needle thread. As the details of construction of the needle thread tension are not essential, they will not be described in detail, it being sufficient to say that the operation of the lever 76 in raising the pressure feed roller serves to release the tension on the needle thread tension device.

The machine is also equipped with a pair of needle thread take-up bars 80 and 81 that project through the top wall of the extension 6 of the member 5. The bars 80 and 81 are coupled by a yoke bar 82 having a screw opening 83 at one end through which a screw extends to fasten the yoke bar 82 to the bar 81, and a screw opening 84 at the other end through which a screw extends to fasten the yoke bar 82 to the bar 80. The yoke bar 82 is provided with a pair of cam rollers 85 and 86 positioned on opposite sides of the cam 20 so that, as the cam 20 is rotated, the bars 80 and 81 will be raised and lowered in accordance with the contour of said cam. The lower end of the bar 80 projects somewhat below that of the bar 81 and is guided in its movement by operating in a bearing 87 in the web 12. Each of the bars 80 and 81 is provided with an eye near its upper end, and there is an intermediate eye 88 positioned near the top of the extension 6 of the member 5 between the bars 80 and 81. Forwardly of the bar 81 there is an eye 89, and, on the opposite side of the bar 80, is an eye 90. A needle thread check spring device 91 is carried on the top of the needle bar 8.

The devices described provide for the proper feed and tension for the needle thread in the operation of the machine. It will be understood that the needle thread is drawn off of the spool and engaged in the needle thread tension and then carried through the eye 90. Thence it passes through the eye in the upper part of the bar 80, then downwardly through the eye 88 and thence through the eye in the bar 81, then carried downwardly through the eye 89 and engaged in the loop of the needle thread check spring device 91, and thence downwardly through the needle bar to a point adjacent to the lower end thereof, from which it passes to the needle through which it is threaded. The needle thread is thus supplied in measured lengths and under proper tension for the needle thread stitch.

For the control of the looper thread, a looper thread tension 92 is attached to the frame of the machine and, as shown in the drawings, on the left wall of the frame member 5. The looper thread is carried from a spool supply to the tension device 92 and is then carried downwardly to a point near the lower wall of the machine frame and passes through an eye 93 supported by the frame of the machine. It is then passed through the loop of a check spring device 94 supported on a bracket 95 in proximity to the eye 93. The check spring device includes a loop 96 which operates against a stop 97 located under said loop 96. From the check spring device the thread passes upwardly and outwardly and is engaged through an eye 98 at the outer end of a looper thread take-up arm 99. The inner end of the arm 99 is adjustably supported in the head 100 of a short stud shaft 101 and is secured in position by a set screw 102. The shaft 101 extends inwardly into a cylindrical recess formed in the rear edge of the left sidewall of the frame of the machine. The inner end of said shaft 101 traverses the lower portion of a slot 103 formed in the left side wall of the frame of the machine. The shaft 101 carries an upwardly extending arm 104, said arm being formed as best shown in Fig. 28. This arm 104 extends upwardly in a generally vertical direction and passes through an opening 105 in a slide bar 106. The edges of the opening 105 are beveled, as best shown in Fig. 28, so that, as the slide bar 106 is reciprocated in a horizontal path of movement, the arm 104 will be rocked and, by reason of its crank arm connection with the shaft 101, will rock said shaft on a horizontal axis, thereby raising and lowering the arm 99. The movement of the slide bar 106, and thereby the movement of the arm 99, is controlled in synchronism with the operation of the other parts of the machine by a cam disc 107 having a cam slot 108 in its underface. The slide bar 106 reciprocates in a housing 109 having a guideway therethrough for said bar 106, the housing 109 being rigidly supported by the web 12. The slide bar 106 carries at its inner end a roller 110 that operates in the cam raceway 108. Since the cam disc 107 is fixed to and is carried by the shaft 32, the cam is rotated and the slide bar 106 is moved in proper timed relation with the other operating parts of the machine to take up and release the looper thread, and the looper thread is measured out in proper lengths for the performance of the looper stitch of the mechanism.

From the eye 98 the looper thread is looped back and again passes through the eye in the spring loop 96. From thence it passes through a guiding eye 111 to and through a horizontally extending eye 112 at the lower end of the looper lever 60, by which it is presented in the proper relation to the stitching point for the formation of the looper stitch.

The sewing hook and the work feeding ring are also driven from the power shaft 27, and the driving connections for these elements may be conveniently described at this point.

The power shaft 27 carries a beveled pinion 113 that meshes with a beveled pinion 114. The beveled pinion 114 is carried at the upper end of a vertical shaft 115 that is journalled at its upper end in a bearing 116 supported by the rear wall of the frame of the machine. The lower end of said shaft 115 passes through a bushing 117 in the base plate, and the end that projects through the bushing carries a beveled pinion 118 that meshes with a beveled pinion 119 carried at the end of a horizontal transverse shaft 120. The shaft 120 is journalled in bearings 121, 122 and 123 supported below the base 1 of the machine. The shaft 120 near the left side of the machine carries a worm 124 that meshes with a worm gear 125 supported on the lower end of a short stud shaft 126, said shaft being connected to the underface of the base plate 1. Above the gear 125 and on the stud shaft 126 is a pinion 127 formed integral with the gear 125, said pinion 127 meshing with a gear 128 supported at the lower end of a shaft 129 below the base plate 1. The shaft 129 is journalled in a bushing 130 extending through the base plate 1 and through the base plate 131 of the post of the machine. The upper end of the shaft 129 is journalled in a bearing 132, and the portion of the shaft that projects above the bearing carries a beveled pinion 133.

The post of the machine includes the base 131, side members 134 and a top plate 135. This structure provides a support for the work and for the bobbin mechanism, as well as a support for the work feeding ring.

The mechanism for driving the sewing hook includes a chain drive comprising a sprocket 136 carried on the shaft 129 and a sprocket 137 which is driven by a chain connection 138 from the sprocket 136. The sprocket 137 is formed on a hub 139 of a gear 140. The said hub 139 of the sprocket 137 and gear 140 are mounted on a short stud shaft 141 supported on the right side member 134 of the post. There are two short shafts 142 supported in the upper part of the post and extending transversely across the post near the front and rear upper edges thereof. The shafts 142 are, therefore, parallel and spaced apart the width of the post, and hence lie on either side of the axis of the gear 140. Each of the shafts carries at its right end a pinion 143 and, at its opposite end, a gear 144. The gears 144 will, therefore, be driven in the same direction of rotation on parallel axes. The gears 144 are the direct driving mechanism for the sewing hook ring gear that will be later described.

On the outer face of the right plate 134 of the post there is a support for the feed ring, the bobbin and the sewing hook. This support includes a plate 145 that is attached directly to the face of the left-hand plate of the post. The plate carries on its outer face a support 146 in which a feed ring 147 is supported, said feed ring lying in an outwardly extending plane. The feed ring cooperates with the pressure feed roller for advancing the work to the sewing position. A throat plate 148 is carried by the upper end of the plate 145 and constitutes a support for the work. The feed ring 147 is driven from the pinion 133 that meshes with a ring gear 149 formed integral with and as a part of the feed ring 147. The plate 145 is recessed on its inner face to form circular recesses 150 in which the gears 144 are mounted. The upper part of the plate is provided with a generally circular opening 151 the edges 152 of which (Fig. 31) are formed to provide a raceway for the sewing hook. It will be noted by reference to Fig. 31 that the circular opening 151 has segmental flanges around its edge forming an inner journal that supports the sewing hook for revoluble movement.

The construction of the sewing hook is shown in detail in Fig. 32, by reference to which it will be understood that this device includes a cylindrical body 153 integrally united with a segmental flange 154, which flange extends partially around the cylindrical body, leaving an intermediate opening. One end of the flange 154 is deflected to the right and is shaped to form one element 155 of the sewing hook. A segmental gear ring 156 having a cut-out portion 157 and having a circular opening 158 fits against the right face of the element of the sewing hook just described, so that the cut-out portion 157 alines with the cut-out portion in said member, and the circular opening 158 alines with the opening formed by the cylindrical portion 153 of the left member of the sewing hook.

The right member of the sewing hook comprises a plate 159 which is in the form of a disc having a cut-out portion 160, said plate 159 being adapted to seat against the right face of the gear ring 156. The edge of the disc 159 is formed with a pointed projection 161 conforming to the general contour of the hook portion 155 but being spaced slightly therefrom by the gear ring 156. The three elements of the sewing hook just described are alined by pins and are connected together by screws 162, the assembled relation of the parts being shown in Fig. 34. The plate 159 carries a short stud 163 on its left face, which projects inwardly through the openings in the ring gear and within the cylindrical body 153, the end of the stud projecting beyond the face of the cylindrical body 153. The stud 163 constitutes the support for a standard bobbin case 164, said case fitting within the opening in the cylindrical body 153 and being removably held in position on the stud 163. Since the bobbin case 164 is of usual construction, it is unnecessary to describe it in detail. It includes a bobbin from which the bobbin thread 165 is drawn. The bobbin thread is then drawn upwardly through an eye 166 in an arm 167 which is carried by the bobbin case, the end of the bobbin thread being drawn upwardly through the throat plate of the machine to a position for a stitching operation.

With the foregoing description of the construction of the machine, the cycle of operation may be understood. For the purpose of describing the cycle of operation, it is convenient to divide the cycle into eight different components, as has been suggested, so that the position of the various parts at each step of the cycle may be more clearly apprehended. The essential positions of each step are illustrated in the drawings and will be pointed out in sequence.

It will be assumed that the machine has previously laid a number of completed stitches, as indicated in Fig. 8, and has reached that position in the cycle at which another basic stitch is about to be formed. This position is shown in Fig. 6. In this position, the needle is shown as descending and approaching the work, indicated by W. The needle is about to enter the margin of the work to the right of the feed mechanism, including the pressure roller and the feed ring, which advances the work beneath the needle in such a manner that a marginal portion of the work extends in the path of the needle. In this initial position the looper bar is idle and is in a position rearward of the needle. It is holding the end of the looper thread and has just completed three stitches over the edge of the work. The rotary position of the looper is determined by the position of the segmental gear and pinion, as indicated in Fig. 7 of the drawings. The looper thread is taut, holding the slack needle thread to the rear of the path of the needle. The needle bar cam rollers, as indicated in Fig. 25, are about to descend in the depression in the needle bar cam. The looper cam rollers ride a horizontal segment of the looper bar cam, as illustrated in Fig. 26. As the power shaft of the machine continues to rotate, thereby rotating the cam control construction, the needle bar descends as the needle bar cam rollers traverse the dip in the cam.

The looper bar remains idle. When the needle bar cam and the looper bar cam, respectively, reach the point shown by the construction lines marked B in Figs. 25 and 26, the needle has descended and raised to the position shown in Fig. 10, which may be considered the second or B position of the machine. Thus, the needle thread is formed in a loop within the path of the stitching hook, as illustrated particularly in Fig. 11. The bobbin thread lies across the loop and in the rear thereof and while the needle is in this position, the sewing hook is alined with the needle and engages the loop. As the needle bar cam 20 continues to rotate, the needle bar cam rollers ascend the reverse slope of the cam and raise the needle bar, approaching the third or C position.

The relationship of the parts in the C position is shown in Figs. 12 and 13. At this point, the needle take-up pulls the needle thread from around the sewing hook. At this point in the cycle, the movement of the looper which carries the stitches over the side is initiated, and the looper moves around the needle thread in an anti-clockwise direction and thereby carries the looper thread around the needle thread and attains the fourth or D position of the cycle, as indicated in Figs. 14 and 15 of the drawings, from which it will be noted that the looper thread has been brought to a position encircling the needle thread from rear to front, the looper having moved in an anti-clockwise direction. During the movement from the C position to the D position, the needle thread is pulled tight, locking the bobbin thread and securing the previously formed binding stitches. When the machine has assumed the D position, the looper initiates another stitch and descends to its lowest position. This is the fifth or E position of the machine and is illustrated particularly in Figs. 16 and 17 of the drawings.

By particular reference to Fig. 17, it will be noted that in this position the sewing hook is across the center of the looper eye 61 in a position to take the stitch from over the side of the work.

In order to provide a sufficient length of thread for the looper to form the loop, the looper thread take-up arm 99 moves downwardly and the looper thread is slack, as clearly shown in Fig. 16. The sewing hook engages the loop presented by the looper and, as the sewing hook continues to revolve, the looper thread take-up reaches its lowest position as the sewing hook tumbles the thread around the bobbin as the looper is raised to its upper position. This step of the operation is the sixth or F position of the machine, and is particularly illustrated in Figs. 18, 19 and 20.

The looper then moves to the next position, carrying the looper thread around the needle thread in a clockwise direction. This is the seventh or G position, and is particularly shown in Figs. 21 and 22 of the drawings. In this position, the looper initiates its downward movement to form another stitch, and the looper thread is locked around the needle or upper basic stitch thread. The looper thread take-up again moves downwardly to allow thread for the stitch. The thread is again caught by the sewing hook, and is tumbled around the bobbin. The looper then moves in an anti-clockwise direction and is locked around the bobbin thread and, at the same time, the looper thread take-up pulls up the stitch. The machine now reaches the eighth or H position, which is shown particularly in Figs. 23 and 24, after which the looper descends and makes another stitch as above described, and returns to initial position.

This completes the cycle of operation of the machine.

By reference to Fig. 8, the work performed by the machine can be understood. At the points marked S in Fig. 8, the needle perforates the work, and these points mark the division point between the basic stitches. The stitches over the side are engaged in the line of basic stitches at their loop ends and are cast over the side and locked in position. It, of course, should be understood that Fig. 8 illustrates in an exaggerated manner the final formation of the stitches to show the relationship of the threads. The work as actually performed by the machine presents a finished binding in which the threads over the side are closely adjacent to each other, forming a substantially continuous overcast marginal binding.

It should be understood that the invention is not limited to the details of construction particularly described, but that it embraces modifications and changes which are within the limits of the appended claims.

What I claim and desire to secure by Letters Patent is:—

1. In a machine of the kind described, a sewing needle, mechanism for operating said sewing needle, a sewing hook cooperatively related to said sewing needle for engaging a bobbin thread with the thread delivered by the sewing needle, a vertically reciprocating device revolubly mounted adjacent to the sewing needle, and synchronized mechanism for driving said device to alternately loop the thread delivered thereby around the bobbin and needle thread and to carry the thread over the margin of the work.

2. In a stitch-forming machine including a work support having a throat plate, mechanism for advancing work flatwise across the throat plate, a vertically reciprocating needle bar carrying a needle at its lower extremity supported above the throat plate, a sewing hook operatively supported below the throat plate, a bobbin for feeding a bobbin thread through the throat plate, a looper bar adapted to reciprocate coaxially with the needle bar from a point above to a point below the throat plate, a looper carried by said looper bar operative connections with said looper for rotating the same around the axis of the needle bar at each end of its vertical stroke, and correlated driving mechanism for operating said needle, said looper bar and looper and said sewing hook to form a longitudinal row of stitching and simultaneously form loop stitches over the margin of the work fed across the path of the needle.

3. In a stitch-forming machine, the combination of a work support including a throat plate, a pressure roller operating above the throat plate, a feeding ring operating below the throat plate and cooperating with said pressure roller to advance the work longitudinally across the throat plate, a lock stitch mechanism including a needle and a sewing hook, a thread looping lever reciprocating vertically across the plane of the throat plate and for forming loops of thread entirely around the threads of the lock stitch and within the path of movement of said sewing hook, and means for operating said thread looping lever in synchronism with said lock stitch mechanism.

4. In a machine of the class described, the combination with stitching mechanism including a needle, a bobbin and a sewing hook, of a looper bar reciprocating vertically and coaxially with the needle, a looper connected to said looper bar, means for operating said looper to rotate it around the axis of the needle at the extremity of each up and down movement thereof to carry the thread over the margin of the work, and means for synchronizing the sewing hook to tumble the needle thread and looper thread around the bobbin and in sequence to form an interlocked connection between the needle thread and looper thread.

5. In a machine of the kind described, the combination of a vertically reciprocating needle bar, a work support equipped with work feeding mechanism for advancing the work below the needle bar, a bobbin located below the work support, a sewing hook operating below the work support, a vertically reciprocating member coaxially arranged with the needle bar having an oscillating arm carried thereby for feeding a thread, cam mechanism for reciprocating the needle bar and said reciprocating member, and a common driving mechanism for operating said cam mechanism to synchronize the movement of said needle bar and said reciprocating member.

6. In a stitch-forming machine including a work support having a throat plate and feeding mechanism for feeding the work flatwise across the throat plate, a vertically reciprocating needle bar supported above the throat plate, a cam for reciprocating said needle bar, a looper bar arranged coaxially with the needle bar, an arm connected to said looper bar, a cam for operating said looper bar, common driving mechanism for said cams, an arm carried by said looper bar having a thread feeding eye, and means for rotating said looper bar around said needle bar in timed relation with the vertical movement of said needle bar and said looper bar.

7. In a machine of the kind described, the combination with a throat plate and work feeding mechanism for advancing work flatwise across the throat plate, of a vertically reciprocating needle bar, a sewing hook cooperating with the needle bar to form a lock stitch, a vertically reciprocating looper bar slidably mounted on said needle bar, a looper lever carried by said looper bar, and operating mechanism for operating said needle bar and looper bar including a common driven shaft and cam connections from said shaft, respectively, to the needle bar and looper bar, whereby said bars are operated in synchronized movement.

8. In a machine of the kind described, the combination with feeding mechanism for advancing the work across a throat plate, of a vertically reciprocating needle bar, a needle carried by said bar for carrying a needle thread through the work, a bobbin located below the throat plate, a vertically reciprocating looper bar slidably mounted on the needle bar, a looper lever carried by said looper bar, means for reciprocating said needle bar and looper bar, a looper thread feeding device, means for operating said feeding device in synchronism with the movement of said looper bar, and a sewing hook for taking the thread from the needle on one rotation and from the looper lever on another rotation.

9. In a machine of the kind described, the combination with feeding mechanism for advancing the work across a throat plate, of a vertically reciprocating needle bar, a needle carried by said bar for carrying a needle thread through the work, a bobbin located below the throat plate, a vertically reciprocating looper bar slidably mounted on the needle bar, a looper lever carried by said looper bar, means for reciprocating said needle bar and looper bar, a looper thread feeding device, means for operating said feeding device in synchronism with the movement of said looper bar, a sewing hook for taking the thread from the needle on one rotation and from the looper lever on another rotation, and gear connections with said sewing hook for driving said sewing hook in timed relation with the movement of the needle bar and the looper bar.

10. In a machine of the kind described, the combination of a vertically reciprocating needle bar carrying a needle for feeding a needle thread, a bobbin for feeding a bobbin thread cooperatively related with said needle bar, a sewing hook for engaging a loop formed by the needle thread, a looper bar reciprocating on the same axis with the needle bar, and a looper lever for feeding a looper thread and for bringing a loop formed of said looper thread into the path of movement of said sewing hook.

11. In a machine of the class described, the combination with stitching mechanism comprising a needle, a bobbin and a sewing hook, of a looper bar arranged to reciprocate vertically and coaxially with respect to the needle, a looper carried by said looper bar, gear connections for rotating the looper about the axis of the needle at the extremity of each stroke thereof, and synchronized means for operating the sewing mechanism and said looper bar and said looper to form a basic stitch and to interlock the needle and bobbin thread with the looper thread.

12. In a machine of the kind described, the combination with a work support having a throat plate therein and work feeding mechanism for advancing the work flatwise across the throat plate, of a vertically reciprocating needle bar, a needle carried by said bar, a sewing hook, a vertically reciprocating looper bar slidably and revolubly mounted on said needle bar, and operating mechanism for operating said needle bar, said sewing hook and said looper bar in synchronism.

13. In a stitch-forming machine, the combination with work feeding mechanism for advancing the work to the stitching point, of a needle bar carrying a needle operating to lay stitches parallel to the margin of the work, a bobbin located below the plane of the work feeding mechanism and operating to supply a bobbin thread to be interlocked with the needle thread, a device arranged coaxially with the needle bar for looping a thread about the needle thread above the work and about the bobbin thread below the work and for throwing parallel strands of stitches over the margin of the work, and a sewing hook cooperating with the needle to interlock the bobbin thread with the needle thread whereby the thread forming the stitches over the margin of the work are alternately locked with the needle thread above the work and with the bobbin thread below the work.

14. In a machine of the kind described, the combination with a throat plate and feeding mechanism for advancing work across the throat plate, of a vertically reciprocating needle bar, a needle supported in said bar, a sewing hook below the throat plate cooperating with the needle for forming a longitudinal row of basic stitches, a looper bar coaxial with the needle bar, an arm carried by said looper bar, and operating mechanism for said looper bar for vertically reciprocating the bar and laterally oscillating the arm to loop a thread carried by said arm around the threads forming the longitudinal row of basic stitches and to lay said threads over the margin of the work in parallel rows extending normal to the basic stitches.

15. In a machine of the kind described, the combination with a throat plate and feeding mechanism for advancing work across the throat plate, of a vertically reciprocating needle device above the throat plate, a sewing hook below the throat plate cooperating with the needle device for forming a longitudinal row of basic stitches, a vertically reciprocating member coaxial with the needle device and having an oscillating arm carried thereby for feeding a thread, operating mechanism for operating said last named device to loop the thread fed thereby around the separate threads forming the longitudinal row of basic stitches and to lay parallel stitches over the margin of the work normal to said basic stitches, and means for pulling up the needle thread to effect a locking engagement of the stitches.

16. A stitch-forming machine comprising a vertical reciprocating needle bar for a needle having an eye for thread, a support for the work through which the needle is to operate, a sewing hook device operatively mounted below the work support and having a central opening, a bobbin mounted in said opening in said sewing hook device, an arm extending from said bobbin and having an eye for the bobbin thread, a vertical reciprocating looper bar above the work support adjacent to said needle bar, a thread looping device pivotally supported by said looper bar, and means for operating said device to loop a loop thread engaged therewith about the needle thread, to extend the loop thread across the side of the work and to loop the loop thread about the bobbin thread and to position to be engaged by said sewing hook device and thereby form successive approximately parallel stitches across the margin and across the edge of the work and interlocked with the stitches formed by the needle thread and the bobbin thread.

PAUL H. DIXON.